United States Patent [19]

Wukusick et al.

[11] Patent Number: 5,812,926
[45] Date of Patent: Sep. 22, 1998

[54] PROCESS FOR HARD FACING A SUBSTRATE

[75] Inventors: Joseph Carl Wukusick, Cincinnati, Ohio; Roger Johnson Perkins, deceased, late of Evandale, Ohio, by Geraldine Faye Perkins, commissioner; Murray Sawyer Smith, Jr., Greenhills, Ohio

[73] Assignee: General Electric Company, Cincinnati, Ohio

[21] Appl. No.: 754,483

[22] Filed: Sep. 3, 1991

[51] Int. Cl.⁶ ............................... B22F 7/04; B05D 3/00
[52] U.S. Cl. ................................... 428/548; 419/8; 419/9; 419/12; 428/551; 428/552; 428/553; 428/560; 428/569; 427/190; 427/191; 427/201; 427/376.3; 427/376.8; 427/383.7
[58] Field of Search .................... 419/5, 6, 7, 8, 419/9, 12, 47; 427/189, 190, 191, 201, 376.3, 376.8, 383.7; 75/245, 246; 428/548, 551, 552, 553, 560, 569

[56] References Cited

U.S. PATENT DOCUMENTS

| Re. 28,552 | 9/1975 | Smith | 148/32 |
|---|---|---|---|
| 2,998,322 | 8/1961 | Strate | 117/22 |
| 3,862,840 | 1/1975 | Nayar | 75/200 |
| 3,989,863 | 11/1976 | Jackson et al. | 427/367 |
| 4,195,764 | 4/1980 | Bogart | 228/208 |
| 4,563,329 | 1/1986 | Morishita et al. | 419/9 |
| 4,596,692 | 6/1986 | Morishita et al. | 419/7 |
| 4,701,357 | 10/1987 | Bose et al. | 427/423 |
| 4,842,953 | 6/1989 | Perkins et al. | 428/553 |
| 4,851,188 | 7/1989 | Schaefer et al. | 419/19 |
| 4,937,042 | 6/1990 | Perkins et al. | 419/8 |

FOREIGN PATENT DOCUMENTS 58-84973  5/1983  Japan .......................... 419/9

OTHER PUBLICATIONS

Warren, R., "Microstructural Development During the Liquid–Phase Sintering of Two–Phase Alloys, with Special Reference to the NbC/Co System", Journal of Materials Science, vol. 3, 1968, pp. 471–474.

Primary Examiner—Kathryn L. Gorgos
Assistant Examiner—Chrisman D. Carroll
Attorney, Agent, or Firm—Andrew C. Hess; David L. Narciso

[57] ABSTRACT

A hard facing alloy is applied to a surface of a substrate by making a mixture of at least two constituents whose net composition is the desired hard facing alloy composition. The constituents have different solidus temperatures, at least one of which is above a processing temperature of the substrate and another of which is below the processing temperature of the substrate. In one preferred approach, the mixture is prepared by pressing and lightly sintering the constituents in the form of powders, so that the mixture retains its shape and can be attached to the substrate surface. Then the substrate is heated to the processing temperature and maintained for a time sufficient to permit interdiffusion of the several different phases toward a homogeneous hard facing alloy composition uniformly through a major portion of the volume.

23 Claims, 2 Drawing Sheets

PROCESS FOR HARD FACING A SUBSTRATE

This invention relates to the protection of materials from wear damage, and, more particularly, to the application of a hard, wear resistant coating to a surface of a metallic substrate.

BACKGROUND OF THE INVENTION

In some of the most challenging materials applications, a load-bearing metallic alloy is used in a wear-producing environment that gradually wears the material away. Most strong, tough alloys are not sufficiently wear resistant to survive for extended periods in such environments. To provide the necessary combination of properties, materials systems have been developed having hard, wear-resistant coatings applied onto more ductile substrates to protect them. The coatings are often known as "hard facings".

One common method of applying a hard facing or coating onto a substrate is welding. A bead of the hard facing material is melted and deposited upon the surface of the substrate. The surface region of the substrate is usually also melted, forming a weld pool of hard facing material and substrate material that solidifies with the coating bonded to the substrate. (This use of the term "welding" is not to be confused with the joining of two pieces by melting them at their surfaces, another common usage of the term.)

Weld application of a hard facing is widely and successfully used. However, it has important disadvantages in some situations. The surface of the substrate is heated, melted, and rapidly solidified, which may result in cracking of the surface. The melted substrate mixes with the hard facing alloy, diluting the hard facing alloy away from its preferred composition.

Weld application of hard facings is a slow, expensive process, and often requires a skilled craftsman in order to achieve good results. Consequently, the quality and thickness of the weld coating are sometimes unpredictable due to personnel, as well as manufacturing variations. The substrate must often be specially heat treated after application of the coating, in order to reduce stresses which could cause the coating to fail during service.

There is a need for an improved method for application of hard coatings to surfaces of substrates. The method should overcome the foregoing disadvantages of the welding process. The present invention fulfills this need, and further provides related advantages.

SUMMARY OF THE INVENTION

The present invention provides a method for application of hard facing overlay coatings to surfaces. It is more controllable than welding, faster to use, and achieves more consistent results. It is also more economical. The quality of the overlay coating is superior to that of a weld coating, because the overlay coating is not extensively diluted by dissolution of material from the substrate surface, although some small amount of interdiffusion between the coating and the substrate does occur to bond the coating to the substrate.

In accordance with the present invention, a process for hard facing a substrate comprises the steps of identifying a hard facing alloy composition; providing the hard facing alloy composition as a mixture of at least two alloy constituents whose net composition is that of the hard facing alloy, a solidus temperature of one constituent being lower than a solidus temperature of any other constituent; applying the mixture of constituents to a surface of the substrate to be hardfaced; heating the surface and mixture of constituents to a hard facing temperature that is higher than the solidus temperature of the lowest melting constituent and lower than a liquidus temperature of at least one remaining constituent; and maintaining the hard facing temperature while the constituents of the mixture consolidate and interdiffuse to form the hard facing alloy composition.

In one embodiment, wherein there are two constituents, a first or low melting constituent and a second or high melting constituent, the hard facing temperature is higher than the solidus temperature of the first constituent and lower than the liquidus temperature of the second constituent.

The present invention utilizes the concepts underlying liquid phase sintering in the hard facing of substrates, in a process termed liquid phase thermal densification. A preselected hard facing alloy composition may preferably be partitioned into two constituents, one constituent having a solidus temperature lower than the maximum processing temperature of the substrate and another constituent having a liquidus temperature higher than the maximum processing temperature of the substrate. The solidus temperature of an alloy is the temperature at which liquid first appears as the solid alloy melts due to heating. The liquidus temperature is the temperature at which, upon further heating, the alloy becomes fully liquid. More than two constituents may be used, as long as at least one of the constituents has a solidus temperature below that of the processing temperature of the substrate. If necessary, additional melting point depressants may be added to the constituent having the lowest solidus temperature to further depress that temperature to the desired solidus temperature. Some elements such as silicon and boron have a strong depressant effect on solidus and liquidus temperatures, and at the same time may contribute to the wear resistance of the final hard facing material through the formation of hard silicide and boride intermetallic compounds.

These various constituents are preferably provided as powders. The powders are mixed and processed to a form that may be handled readily and applied to the surface of the substrate. Such a form may be, for example, a pressed or pressed-and-sintered preform, a hot isostatically pressed preform, a slurry of the powders in a liquid carrier, or a tape comprised of a dispersion of powder particles in a solid organic binder. The mixture is applied to the surface of the substrate by any procedure that is appropriate to the form in which the powders are provided. For example, a preform may be tack welded or brazed to the surface, a slurry may be painted onto the surface and the carrier evaporated, or a tape may be adhesively fastened to the surface. The substrate and attached constituent mixture are heated to a temperature higher than the solidus temperature of the lowest melting constituent but lower than the liquidus temperature of the highest melting constituent. The lowest melting constituent acts in the manner of the liquid phase of a liquid-phase sintered part, causing rapid densification and interdiffusion toward a homogeneous final structure of the preselected net hard facing alloy composition.

Those skilled in the art will recognize that the performance of the hard facing alloy after application to the substrate depends very strongly on the preselected net hard facing alloy composition, even though that net composition might be achieved through many different combinations of the compositions and relative amounts of the two or more constituent powders. Thus, adjustments in the compositions and relative amounts of the constituent powders, which might facilitate conduct of the hard facing operation, are preferably made only within the context of achieving the preselected net hard facing alloy composition. In the same way, the impact of unintentional alloy additions, whether introduced through dilution by dissolution of substrate material in the melted first constituent, through unintentional components of the various constituents, or otherwise, is critical to the present invention only to the extent that it affects the performance of the hard facing alloy.

The substrate and its surface are not melted during the hard facing operation, an important advantage if the microstructure of the substrate is to be retained. A slight degree of interdiffusion between the topmost surface layers of the substrate and the preform as it densifies and bonds to the substrate is desirable.

The present invention therefore provides an advance in the art of protection of surfaces by wear resistant coatings. Other features and advantages of the invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
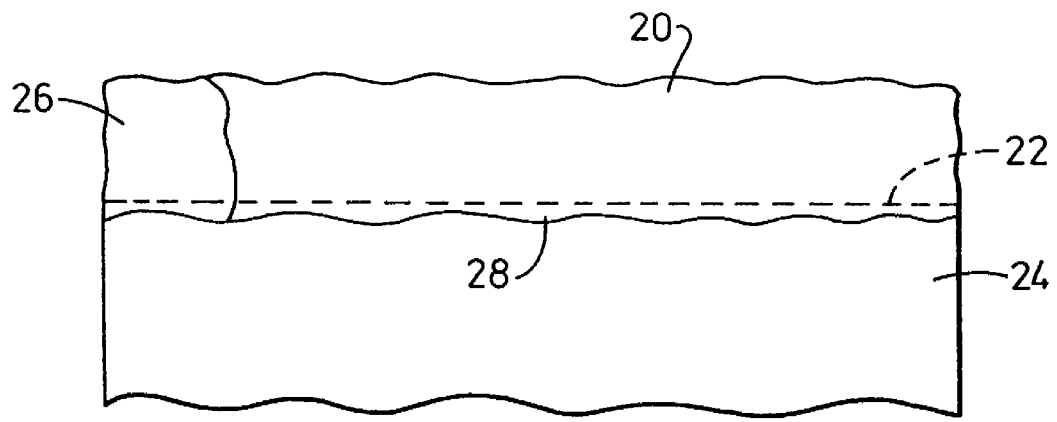
FIG. 1 is an elevational view of a substrate having a welded overlay coating.

FIG. 1 illustrates the prior approach for applying a hard facing coating 20 to a surface 22 of a substrate 24. In depositing the coating 20, a bead of a hard facing alloy is melted in contact with the surface 22 to form a weld pool 26. A portion 28 of the substrate 24 at the surface 22 also melts by conduction or, alternatively, by introduction of heat into the substrate. The alloying elements of the melted portion 28 of the substrate 24 mix with the alloying elements of the weld pool 26 at each location, diluting the composition of the hard facing alloy. The extent of dilution is illustrated in Example 1, below. Moreover, as with other welding processes, there is a heat affected zone that extends down into the substrate, altering its microstructure.

In accordance with the present invention, a materials system comprises a substrate; a mixture having a preselected overall hard facing composition and comprising a mixture of powders including a first constituent with a solidus temperature lower than a preselected substrate processing temperature and a second constituent with a liquidus temperature higher than the preselected substrate processing temperature; and means for affixing the mixture to the surface. Additional constituent powders may be incorporated into the mixture for purposes such as optimizing the overall hard facing composition for particular applications or adjusting the preferred processing temperature of the hard facing alloy to better match that of the substrate.

Figure 2:
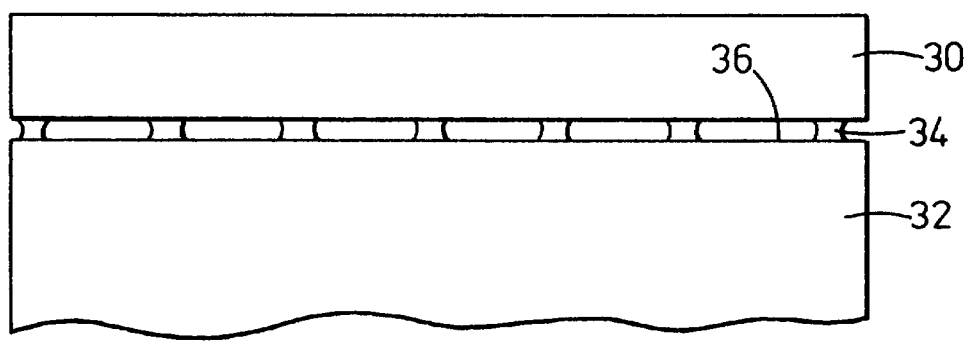
FIG. 2 is an elevational view of a substrate with an overlay preform in position for bonding to the surface of the substrate.

In the presently preferred implementation of the invention, illustrated in FIG. 2, a powder preform 30 is prepared with an overall or net composition equal to that of the preselected hard facing alloy. The powder preform 30 contains preferably two separate powder constituents of different compositions. One of the constituents, a high melting powder constituent, has both its liquidus and solidus temperatures higher than a preselected temperature of processing a substrate 32, and it is therefore substantially solid at the preselected temperature. The other constituent, a low melting powder constituent, has both its liquidus and solidus temperatures lower than the preselected temperature of processing the substrate 32, and it is substantially liquid at that temperature. More specifically, the optimum processing schedule of temperature and time for the substrate 32 will be known from the nature of the material. For example, if it were known that during processing, the substrate 32 was to be heated to 2200° F., then the preform 30 would be formed from two powder constituents, one with liquidus and solidus temperatures higher than 2200° F. and another with liquidus and solidus temperatures below 2200° F. These solidus and liquidus temperatures are attained by partitioning the elements that are melting point depressants, such as silicon or boron, primarily to the low melting powder constituent. The powders of the preform are usually pressed together and possibly given a very light sintering to consolidate the preform 30 for convenient handling and affixing to the surface of the substrate 32.

There is further a means for affixing the preform 30 to the substrate 32. This affixing is required to hold the preform 30 in place, and to aid in wetting the preform 30 to the substrate 32 in order to achieve bonding. The means for affixing can be, for example, a tack weld 34 of the preform 30 to the substrate 32.

When the preform 30 is heated to a temperature higher than the solidus temperature of the low melting powder constituent, a liquid phase forms, while the high melting powder constituent remains substantially solid. The preform 30 remains essentially unchanged in shape, and does not sag or run down the face of the substrate, even if the substrate is inclined or upside down. The molten phase formed by the lower melting powder constituent interdiffuses with the powder of the high melting phase with resulting densification of the preform, and also interdiffuses with a surface 36 of the substrate 32. However, because the temperature is much lower than in the practice for the welding approach of FIG. 1, the surface 36 is not grossly altered. Only a very small amount of the alloying elements of the substrate 32 enter the molten phase of the preform, and there is consequently very little dilution of the hard facing alloy of the preform 30.

Figure 3:
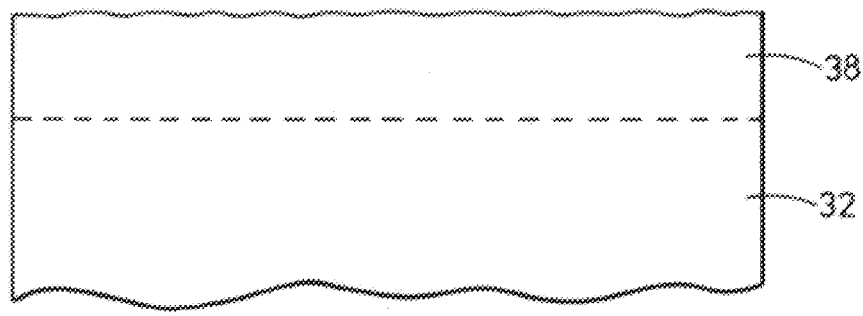
FIG. 3 is an elevational view of a substrate having a hard facing layer applied by the approach of the invention.

With increasing hold time at the processing temperature, the conversion of the two-powder structure of the preform to the structure of the hard facing alloy becomes more complete. The final result, illustrated in FIG. 3, is a surface hard facing layer 38 joined to the substrate 32 by interdiffusion. The hard facing layer typically exhibits at least some microstructural regions indicative of a liquid phase sintered material.

The approach of the present invention achieves the hard facing layer on the substrate without grossly melting the substrate or forming a heat affected zone on the substrate.

The following examples are intended to illustrate aspects of the invention, and should not be interpreted as limiting the invention in any respect.

EXAMPLE 1

A hard facing alloy having the nominal composition of, in weight percent, about 17.5 percent chromium, 28.5 percent molybdenum, 3.4 percent silicon, balance cobalt, was applied to substrate articles by prior art weld application technique. The substrate articles were turbine blades for a gas turbine engine, comprised of the widely used nickel-base alloy Rene '77. The nominal composition of Rene '77 is: about 58% Ni, about 14.6% Cr, about 15.0% Co, about 4.2% Mo, about 4.3% Al, about 3.3% Ti, about 0.07% C, about 0.016% B, about 0.04% Zr. Upon examination by electron microprobe analysis, a colleague of the inventors determined that in eight different specimens, the hard facing alloy had been diluted by melting the substrate to the extent that the hard facing alloy contained, on average, about 11 percent nickel. In spite of the dilution, the hard facing alloy was judged to provide acceptable wear resistance in engine operation.

EXAMPLE 2

Figure 4:
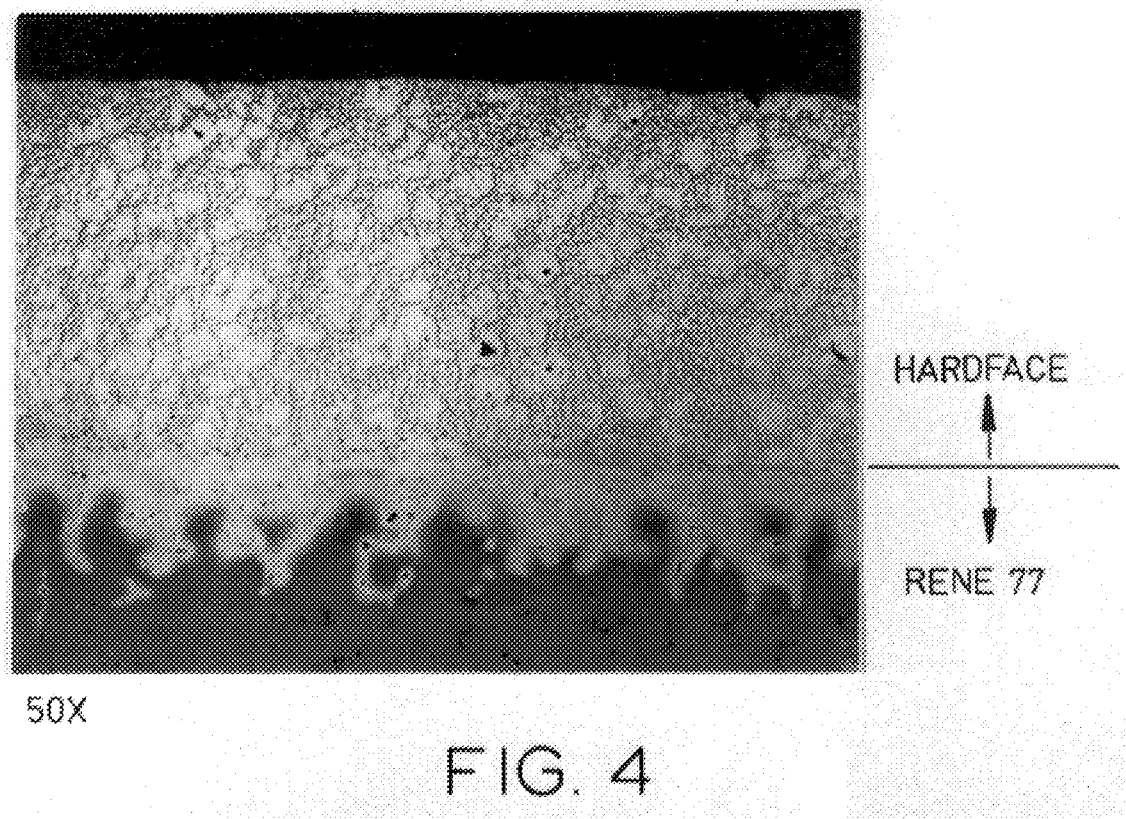
FIG. 4 is a metallurgical micrograph of the microstructure of the hard facing layer. Magnification is approximately 50X.

A net hard facing alloy composition, in weight percent, of about 17.3 percent chromium, 19 percent molybdenum, 5.6 percent silicon, 0.3 percent boron, up to about 10 percent nickel, balance cobalt, is selected. A high melting powder constituent having a nominal composition, in weight percent, of about 17.5 percent chromium, 28.5 molybdenum, 3.4 percent silicon, balance cobalt and a low melting powder constituent having a nominal composition, in weight percent, of 17 percent chromium, 10 percent silicon, 1 percent boron, balance cobalt, are mixed together in the ratio of 2:1, by weight. The powder mixture is consolidated to a preform by cold pressing and brief sintering, and then affixed to a nickel-based alloy substrate, in this case the widely used alloy Rene '77, by capacitance discharge tack welding. Upon heating the substrate and the attached powder preform to about 2200° F. for 30 minutes, the low melting powder constituent forms a liquid phase and causes bonding to the substrate, and internal interdiffusion toward a homogeneous hard facing layer. FIG. 4 is a micrograph of the resulting structure, which is characteristic of a liquid phase sintered material. The hardness of the resulting material is about 52 Rockwell hardness scale C(HRC).

EXAMPLE 3

A net hard facing alloy composition, in weight percent, of about 14.7 percent chromium, 14.8 percent molybdenum, 5.1 percent silicon, 0.3 percent boron, up to about 10 percent nickel, balance cobalt, is selected. A low melting powder constituent having a nominal composition, in weight percent, of 17 percent chromium, 10 percent silicon, 1 percent boron, balance cobalt, is mixed together with a high melting constituent, cobalt powder, and a third powder constituent having a nominal composition, in weight percent, of about 17.5 percent chromium, 28.5 molybdenum, 3.4 percent silicon, balance cobalt in the ratio of 52:15:33, by weight. A hard facing material is prepared as in Example 2. The hardness of the resulting material is about 45 HRC.

EXAMPLE 4

A powder preform is prepared by mixing two powder constituents and consolidating the mixture. The compositions of the powders are as follows. The high melting powder constituent has a composition, in weight percent, of from about 10 to about 30 percent chromium, from about 5 to about 35 percent molybdenum, from about 1 to about 10 percent silicon, from 0 to about 1 percent boron, balance cobalt. More specifically, the higher melting constituent has a composition of about 17 percent chromium, about 28 percent molybdenum, and about 5 percent silicon, about 0.3 percent boron, balance cobalt. The low melting powder constituent has a composition, in weight percent, of about 17 percent chromium, about 10 percent silicon, about 1 percent boron, balance cobalt. Preferably, the ratio of the powder constituents that are mixed together is about ⅔ by weight of the high melting powder constituent and about ⅓ by weight of the low melting powder constituent. The powder mixture is consolidated and affixed to a substrate, as in Example 2.

In this hardfacing, the silicon and molybdenum react to form a molybdenum silicide hard intermetallic phase that resists wear damage of the surface. The silicon is also a melting point depressant, as is the boron, and both are supplied primarily in the low melting powder constituent. However, there must always be some silicon in the high melting component to promote wetting and densification. Chromium provides corrosion protection. The matrix is principally cobalt. The cobalt oxide formed on the surface of the matrix acts as a lubricant at elevated temperatures. The preferred net hard facing alloy composition is about 18 percent chromium, about 16 percent molybdenum, about 5.2 percent silicon and about 0.3 percent boron, up to about 10 percent nickel, balance cobalt. Throughout this discussion, the term cobalt is taken to include small amounts of incidental elements and impurities which in character and/or amount do not adversely affect the advantageous aspects of the metal or alloy. In particular, industry specifications for cobalt alloys, such as the specifications published by American Society for Testing and Materials, and by Society of Automotive Engineers, typically permit unintentional nickel content up to 3 percent by weight and unintentional iron content up to 3 percent by weight. Thus unless specifically stated otherwise, the usage of the term cobalt, following industry practice, is taken to include up to about 3 percent by weight nickel and up to about 3 percent by weight iron, relative to the composition of whatever net hard facing alloy composition or constituent is being described.

The present technique for hard facing a substrate provides important practical advantages over weld facing. Although the present invention has been described in connection with specific examples and embodiments, it will be understood by those skilled in the arts involved that the present invention is capable of modification without departing form its spirit and scope as represented by the appended claims.

What is claimed is:

1. A process for hard facing a substrate, comprising the steps of:

providing a hard facing alloy composition which is a mixture of at least two alloy constituents whose net composition is that of the hard facing alloy, further comprising a first constituent having a solidus temperature lower than a solidus temperature of any other constituent and a second constituent having a liquidus temperature higher than a liquidus temperature of any other constituent wherein the hard facing alloy composition consists essentially of, in weight percent, from about 12 to about 25 percent chromium, from about 12 to about 19 percent molybdenum, from about 4 to about 6 percent silicon, from 0 to about 0.6 percent boron, from 0 to about 10 percent nickel, balance cobalt;

applying the mixture of constituents to a surface of the substrate;

heating the surface and mixture of constituents to a hard facing temperature that is higher than the solidus temperature of the first constituent and lower both than the liquidus temperature of the second constituent and the melting temperature of the substrate; and maintaining the hard facing temperature for a time sufficient to consolidate and interdiffuse the constituents of the mixture to form the hard facing composition.

2. The process of claim 1, wherein the first constituent consists essentially of, in weight percent, from about 10 to about 28 percent chromium, from 0 to about 10 percent molybdenum, from about 5 to about 12 percent silicon, 0 to about 1.5 percent boron, balance cobalt; wherein the second constituent consists essentially of cobalt; wherein a third constituent consists essentially of, in weight percent, from about 10 to about 30 percent chromium, from about 5 to about 35 percent molybdenum, from about 0.5 to about 5 percent silicon, from 0 to about 1 percent boron, balance cobalt.

3. The process of claim 1, wherein the constituents are supplied as powders, and the step of applying further includes the substeps of forming the powders into a preform having a preselected shape, and fastening the preform to the surface of the substrate.

4. The process of claim 3, wherein the substep of fastening includes the step of welding the preform to the surface.

5. The process of claim 3, wherein the substep of fastening includes the step of brazing the preform to the surface.

6. The process of claim 1, wherein the constituents are supplied as powders, and are mixed with a liquid carrier to form a slurry.

7. The process of claim 6, wherein the step of applying includes the substep of placing the slurry on the surface of the substrate and evaporating the carrier so that the constituents are dried onto the surface.

8. The process of claim 1, wherein the constituents are supplied in the form of a tape comprised of constituent powders dispersed in a solid organic binder.

9. The process of claim 8, wherein the step of applying includes the substep of fastening the tape to the surface of the substrate.

10. A hard faced substrate prepared by the process of claim 1.

11. A process for hard facing a substrate, comprising the steps of;

providing a hard facing alloy composition which is a mixture of at least two alloy constituents whose net composition is that of the hard facing alloy, comprising a first constituent having a solidus temperature lower than a solidus temperature of a second constituent and the second constituent having a liquidus temperature higher than a liquidus temperature of the first constituent, wherein the hard facing alloy composition consists essentially of, in weight percent, from about 10 to about 28 percent chromium, from about 10 to about 20 percent molybdenum, from about 2 to about 7 percent silicon, from 0 to about 1 percent boron, from 0 to about 10 percent nickel. balance cobalt;

applying the mixture of constituents to a surface of the substrate;

heating the surface and mixture of constituents to a hard facing temperature that is higher than the solidus temperature of the first constituent and lower than the liquidus temperature of the second constituent and lower than the melting temperature of the substrate; and maintaining the hard facing temperature for a time sufficient to consolidate and interdiffuse the constituents of the mixture to form the hard facing alloy composition.

12. The process of claim 11, wherein the hard facing alloy composition consists essentially of, in weight percent, from about 15 to about 25 percent chromium, from about 14 to about 19 percent molybdenum, from about 4 to about 6 percent silicon, from 0 to about 0.6 percent boron, from 0 to about 10 percent nickel, balance cobalt.

13. The process of claim 11, wherein the step of providing the hard facing alloy composition includes providing the first constituent having at least one melting point depressant element.

14. The process of claim 11, wherein the hard facing temperature is higher than the liquidus temperature of the first constituent.

15. The process of claim 11, wherein the hard facing temperature is lower than the solidus temperature of the second constituent.

16. The process of claim 11, wherein a liquidus temperature of the first constituent is lower than a solidus temperature of the second constituent.

17. The process of claim 16, wherein the hard facing temperature is higher than the liquidus temperature of the first constituent and lower than the solidus temperature of the second constituent.

18. A process for hard facing a substrate, comprising the steps of:

providing a hard facing alloy composition which is a mixture of at least two alloy constituents whose net composition is that of the hard facing alloy, comprising a first constituent having a solidus temperature lower than a solidus temperature of a second constituent and the second constituent having a liquidus temperature higher than a liquidus temperature of the first constituent, wherein the first constituent has a composition, in weight percent, of about 10 to about 28 percent chromium, from 0 to about 10 percent molybdenum, from about 5 to about 12 percent silicon, and from 0 to about 2 percent boron, balance cobalt;

applying the mixture of constituent to a surface of the substrate:

heating the surface and mixture of constituents to a hard facing temperature that is higher than the solidus temperature of the first constituent and lower than the liquidus temperature of the second constituent and lower than the melting temperature of the substrate; and maintaining the hard facing temperature for a time sufficient to consolidate and interdiffuse the constituents of the mixture to form the hard facing alloy composition.

19. The process of claim 18, wherein the first constituent has a composition, in weight percent, of about 15 to about 25 percent chromium, about 6 to about 12 percent silicon, 0 to about 1.5 percent boron, balance cobalt.

20. A process for hard facing a substrate, comprising the steps of:

providing a hard facing alloy composition which is a mixture of at least two alloy constituents whose net composition is that of the hard facing alloy, comprising a first constituent having a solidus temperature lower than a solidus temperature of a second constituent and the second constituent having a liquidus temperature higher than a liquidus temperature of the first constituent, wherein the second constituent has a composition, in weight percent, of from about 10 to about 30 percent chromium, from about 5 to about 35 percent molybdenum, from about 0.5 to about 5 percent silicon, from 0 to about 1 percent boron, balance cobalt;

applying the mixture of constituents to a surface of the substrate:

heating the surface and mixture of constituents to a hard facing temperature that is higher than the solidus temperature of the first constituent and lower than the liquidus temperature of the second constituent and lower than the melting temperature of the substrate; and maintaining the hard facing temperature for a time sufficient to consolidate and interdiffuse the constituents of the mixture to form the hard facing alloy composition.

21. The process of claim 20, wherein the second constituent has a composition, in weight percent, of about 15 to about 25 percent chromium, about 22 to about 30 percent molybdenum, about 1 to about 4 percent silicon, balance cobalt.

22. A substrate protected by a hard facing thereupon, comprising:

a substrate;

a hard facing coating of a preselected composition and a liquid phase sintered microstructure overlying the substrate, the surface of the substrate adjacent the hard facing coating being substantially melted, wherein the preselected composition of the hard facing coating consist essentially of, in weight percent from about 10 to about 28 percent chromium, from about 10 to about 20 percent molybdenum, from about 2 to about 7 percent silicon, from 0 to about 1 percent boron, from 0 to about 10 percent nickel, balance cobalt.

23. A materials system, comprising:

a substrate;

a mixture having a preselected overall hard facing composition and comprising a mixture of powders including a first constituent having a solidus temperature lower than a preselected substrate processing temperature and a second constituent having a liquidus temperature higher than the preselected substrate processing temperature, wherein the preselected overall hard facing composition consists essentially of, in weight percent, from about 10 to about 28 percent chromium, from about 10 to about 20 percent molybdenum, from about 2 to about 7 percent silicon, from 0 to about 1 percent boron, from 0 to about 10 percent nickel, balance cobalt; and means for affixing the mixture to the surface.

\* \* \* \* \*